US008615810B2

(12) United States Patent
Kim et al.

(10) Patent No.: US 8,615,810 B2
(45) Date of Patent: Dec. 24, 2013

(54) METHOD AND SYSTEM FOR PREVENTING COPYING OF INFORMATION FROM PREVIEWS OF WEBPAGES

(75) Inventors: Suyoung Kim, Seongnam-si (KR); Tae Ho Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 830 days.

(21) Appl. No.: 12/146,368

(22) Filed: Jun. 25, 2008

(65) Prior Publication Data

US 2009/0007273 A1    Jan. 1, 2009

(30) Foreign Application Priority Data

Jun. 26, 2007    (KR) .................. 10-2007-0063248

(51) Int. Cl.
H04L 29/06    (2006.01)
G06F 21/00    (2013.01)

(52) U.S. Cl.
USPC ........................................................ 726/33

(58) Field of Classification Search
None
See application file for complete search history.

(56) References Cited

U.S. PATENT DOCUMENTS

| | | | |
|---|---|---|---|
| 6,209,030 B1 | 3/2001 | Ohashi | |
| 6,353,892 B2 * | 3/2002 | Schreiber et al. | 726/26 |
| 6,449,721 B1 | 9/2002 | Pensak et al. | |
| 7,305,713 B1 * | 12/2007 | Crance | 726/33 |
| 2001/0000265 A1 | 4/2001 | Schreiber et al. | |
| 2002/0129051 A1 * | 9/2002 | Abdelhadi et al. | 707/501.1 |
| 2003/0045325 A1 | 3/2003 | Nakamoto | |
| 2003/0078856 A1 * | 4/2003 | Zubi | 705/26 |
| 2005/0071663 A1 * | 3/2005 | Medvinsky et al. | 713/200 |
| 2005/0240759 A1 | 10/2005 | Rubin et al. | |

FOREIGN PATENT DOCUMENTS

| | | |
|---|---|---|
| JP | 8-190545 | 7/1996 |
| JP | 2003-044297 | 2/2003 |
| KR | 10-2006-0002103 A | 1/2006 |
| KR | 100683166 | 2/2007 |

OTHER PUBLICATIONS

Office Action Issued on May 27, 2009 of Corresponding Korean Patent Application No. 10-2007-0063248—3 Pages.
"Java Script Embedded IPPSAS" was published in"Nikkai Internet Solution" issued on Jun. 22, 2003 , vol. 72, p. 96-103.
Non-Final Office Action of U.S. Appl. No. 13/243,750 dated Feb. 14, 2013.
Final Office Action issued in U.S. Appl. No. 13/243,750 on Aug. 14, 2013.
Notice of Allowance issued on Oct. 28, 2013 in U.S. Appl. No. 13/243,750.

* cited by examiner

*Primary Examiner* — Gilberto Barron, Jr.
*Assistant Examiner* — David Le
(74) *Attorney, Agent, or Firm* — H.C. Park & Associates, PLC

(57) ABSTRACT

A copy prohibition method and system is disclosed, which can provide a preview page with copy prohibition means inserted thereinto, so as to prohibit a copy of information displayed on the preview page, the method comprising receiving a selection request for a preview page of a predetermined webpage from a user; inserting copy prohibition means into the preview page; and providing the preview page with the copy prohibition means inserted thereinto to the user. When providing the preview page to the user, the user is notified that the corresponding preview page has the copy prohibition function. Thus, the user becomes easily aware of that the copy is prohibited in the corresponding preview page.

18 Claims, 4 Drawing Sheets

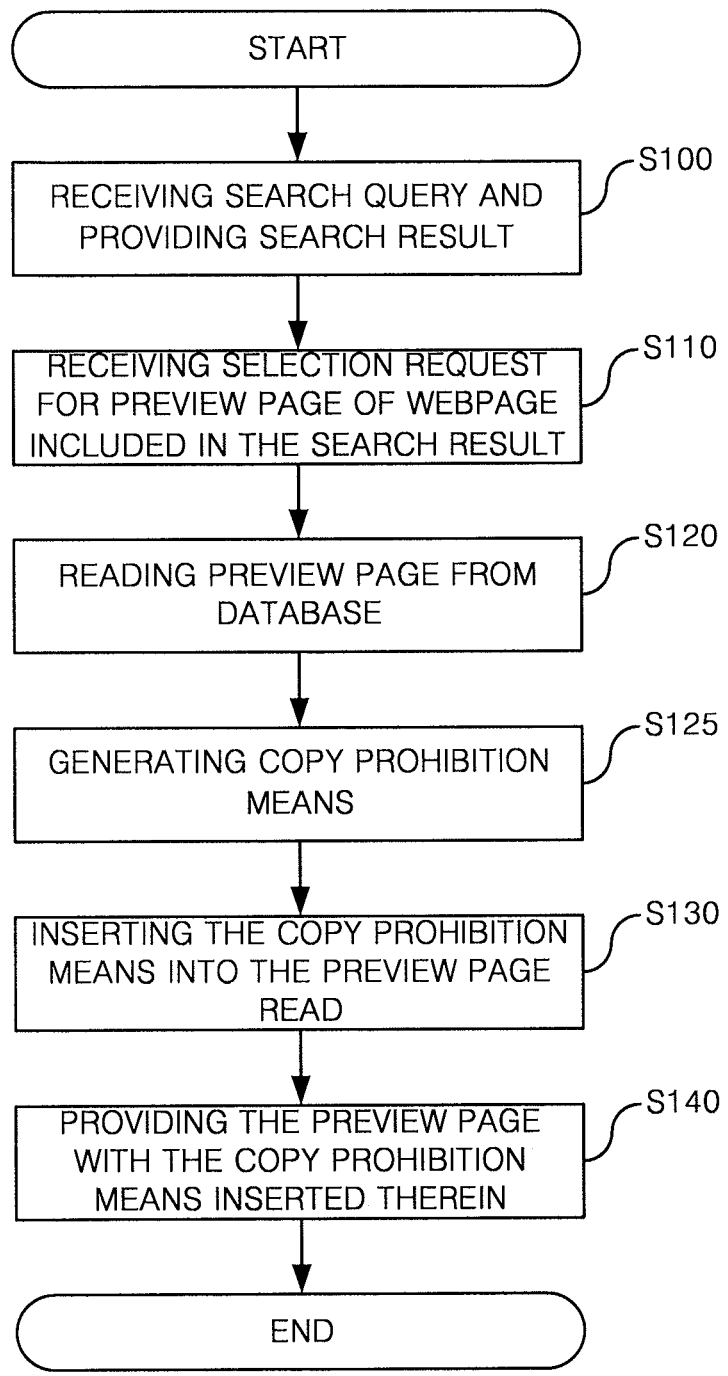

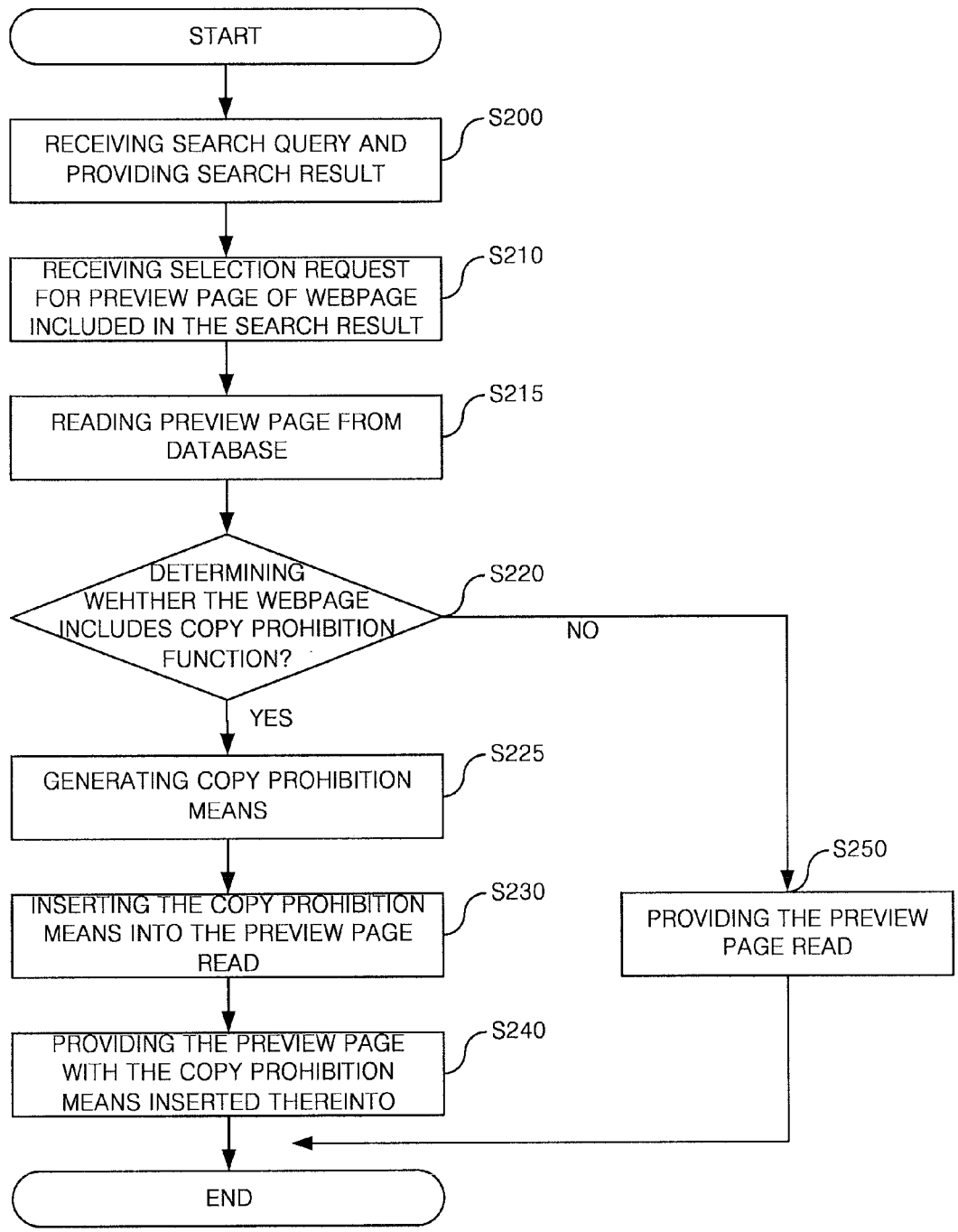

METHOD AND SYSTEM FOR PREVENTING COPYING OF INFORMATION FROM PREVIEWS OF WEBPAGES

RELATED APPLICATION

This application claims the benefit of Korean Patent Application No. 10-2007-0063248, filed on Jun. 26, 2007, which is hereby incorporated by reference in its entirety.

BACKGROUND

1. Field

The present disclosure relates to internet related services and more particularly prohibiting unauthorized copies of contents of web pages from their previews.

2. Discussion of the Related Art

There are Internet services providing previews of certain webpages. The webpage previews include a portion of the target webpages as displayed in the target webpages. The webpage preview services are typically used in combination with Internet searches, Internet shopping, etc. For example, certain Internet search services provide a search result listing along with preview of certain webpages located in their searches. Another example is on-line bookstores, which provide excerpts or previews of user selected books.

The foregoing discussion is solely to provide background information of this disclosure and does not constitute an admission of prior art.

SUMMARY

One aspect of the invention provides a method of providing a copy prevention feature in a preview of a web page. The method comprises: selecting at least a portion of a first webpage; formulating a content comprising a preview of the first webpage, the preview comprising the selected portion; and transmitting, to a remote terminal, the content along with a command for preventing the preview from being copied on the remote terminal.

In the foregoing method, the command may be configured to trigger a computer program for blocking a copying function of a browser. The command may be incorporated in codes for displaying the content. The codes may include a Java Script. The content can include a search result listing a plurality of webpages comprising the first webpage; or a synopsis of a book or literature comprising a portion of the book or literature as the preview; or a page of an on-line bookstore comprising a portion of a book for sale as the preview. The foregoing method may further comprise receiving, from the remote terminal, a request for displaying a preview of the first webpage; and the selecting is carried out prior to or subsequent to receiving the request.

The method may further include providing a database comprising a plurality of entries of webpages, for which the command is to be transmitted along with a preview thereof; and determining the first webpage is listed in the database prior to transmitting. Providing the database may include determining if a second webpage incorporates a copy prevention technology for information contained therein; and adding the second webpage to the database. The method may further comprise determining if the portion is copy-protected on the first webpage prior to transmitting. The determining may include searching for a copy-preventing command in codes of the first webpage. The foregoing method may further comprise determining whether a URL of the first webpage is any one in a list of predetermined URLs, wherein when the URL of the first webpage is any one in the list of predetermined URLs, transmitting the content along with the command to the remote terminal, Another aspect of the present invention provides a method of displaying a web content comprising a preview of a webpage. The method comprises: receiving data for displaying a web content; and displaying, on a terminal, the web content comprising a preview of a web page, wherein the preview is configured so as to prevent at least part of the preview from being copied. The method may further include attempting, on the terminal, to copy at least part of the preview from the displayed web content; generating a notification configured to notify the preview is copy-protected. The data can include the preview and command for preventing the preview from being copied on the terminal. The command can be configured to trigger a computer program for blocking a copying function of a browser on the terminal, or may be incorporated in codes for displaying the web content. The codes may include a Java Script.

Yet another aspect of the present invention may provide a system for providing a web content comprising a preview of a webpage. The system comprises a selection module configured to select at least a portion of a first webpage; a web content module configured to formulate a web content comprising a preview of the first webpage, the preview comprising the selected portion; and a transmission module configured to transmit, to a remote terminal, the web content along with a command for preventing the preview from being copied on the remote terminal. The foregoing system may further comprise a determining module configured to determine whether a URL of the first webpage is any one in a list of predetermined URLs, wherein the transmission module transmits the web content along with the command to the remote terminal when the URL of the first webpage is any one in the list of predetermined URLs. The determining module may further determine if the portion is copy-protected on the first webpage. The command can be configured to trigger a computer program for blocking a copying function of a browser on the remote terminal or may be incorporated in codes for displaying the web content. The codes may include a Java Script. The web content can include a search result comprising the webpage.

Another aspect of the present invention provides a copy prohibition method and system which can provide a preview page with copy prohibition means inserted thereinto, so as to prohibit a copy of information displayed on the preview page.

Another aspect of the present invention provides a copy prohibition method and system which can display information that the copy is prohibited in the corresponding preview page.

Another aspect of the present invention provides a copy prohibition method and system which can determine to insert copy prohibition means into a preview page based on whether a corresponding webpage includes a copy prohibition function in itself.

Additional advantages, aspects and features of the invention will be set forth in part in the description and will become apparent to those having ordinary skill.

According to one embodiment, a method of prohibiting copy comprises receiving a selection request for a preview page of a predetermined webpage from a user; inserting copy prohibition means into the preview page; and providing the preview page with the copy prohibition means inserted thereinto to the user.

In one embodiment of the present invention, the method comprises determining whether a URL of the predetermined webpage is any one in a list of predetermined URLs, wherein when the URL of the predetermined webpage is any one in the list of predetermined URLs, the copy prohibition means is inserted into the preview page.

In another embodiment of the present invention, the method comprises determining whether the predetermined webpage includes a copy prohibition function in itself, wherein when it is determined that the predetermined webpage includes the copy prohibition function in itself, the copy prohibition means is inserted into the preview page.

At this time, the copy prohibition means is implemented using Java Script. Also, the copy prohibition means includes the information displaying that the copy is prohibited in the corresponding preview page.

In another aspect of the present invention, a system for prohibiting copy comprises a copy prohibition unit to insert copy prohibition means to a preview page when receiving a selection request for the preview page of a predetermined webpage from a user; and an interface unit to receive the selection request for the preview page from the user, and to provide the preview page with the copy prohibition means inserted thereinto to the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart showing a copy prevention method according to one embodiment of the present invention; and FIG. 4 is a flowchart showing a copy prevention method according to another embodiment of the present invention.

DETAILED DESCRIPTION OF EMBODIMENTS

Reference will now be made in detail to various embodiments of the present invention, examples of which are illustrated in the accompanying drawings. The same reference numbers are generally used throughout the drawings to refer to the same or like parts. Hereinafter, a method and system for prohibiting copy of contents according to the present invention will be explained with reference to the accompanying drawings.

Figure 1:
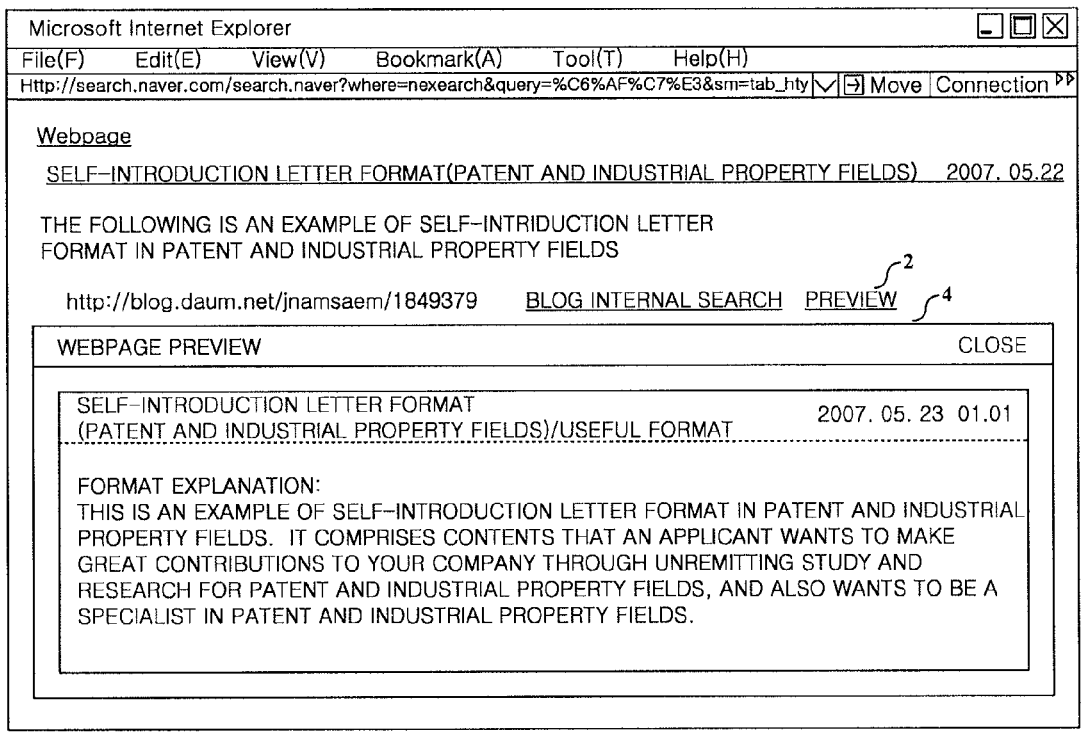
FIG. 1 is an exemplary screen showing a preview service used in a search service.

FIG. 1 is an exemplary screen showing a result of an Internet search, using a search query "patent." The result includes a preview 4 of a webpage located from the search. In one embodiment, the search result does not include the preview; however, the preview may display upon user's selection or clicking of the preview link 2.

Certain webpages contain proprietary information or contents, which the owners or posters of such information or contents do not wish to distribute without their authorization. Some of such webpages use a copy prevention or prohibition technology that prevents others from copying such information or contents without authorization of the owners or the webpage administrators. When these webpages are listed in Internet search results like FIG. 1, at least a portion of the proprietary information or contents may be displayed in the preview section 4 of the search result page. In some situations, even though these webpages adopt a copy prevention technology, it is possible that the preview portion may still be copied for use in another software application. Embodiments of the invention provide solutions and ways to prevent unauthorized copying of such proprietary information or contents from previews of webpages.

Figure 2:
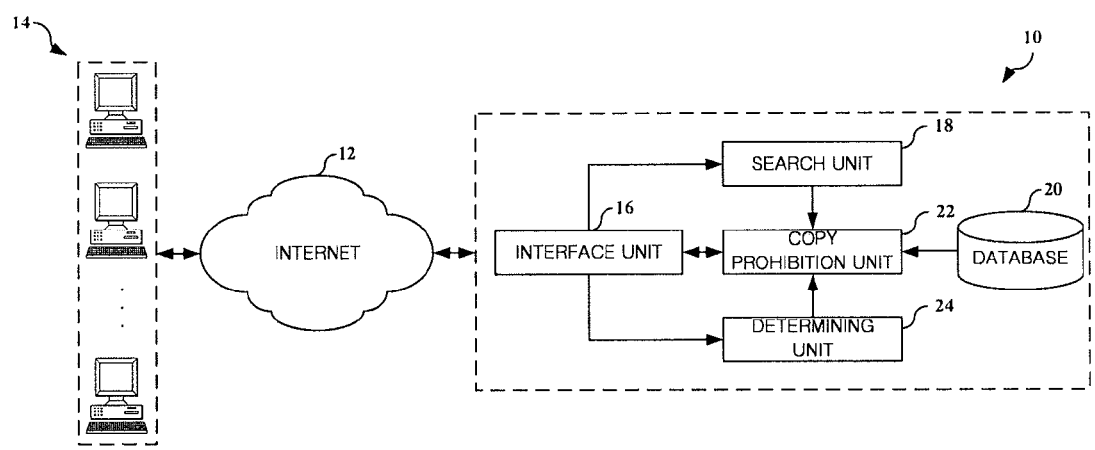
FIG. 2 is a diagram showing a network with a copy prevention system according to one embodiment of the present invention.

FIG. 2 is a diagram showing a network with a copy prohibition system according to one embodiment of the present invention. As shown in FIG. 2, the copy prohibition system 10 provides a tool for blocking copying of a preview content provided to a user terminal 14 through Internet 12. The copy prohibition system 10 includes an interface unit 16, a search unit 18, a database 20 and a copy prohibition unit 22.

The interface unit 16 receives a search query from a user; and provides a search result obtained in response to the search query to the user. Also, the interface unit 16 receives a preview request for a predetermined webpage among the search result provided from the user; and provides a preview page, into which copy prohibition means is inserted in response to the received preview request, to the user.

The search unit 18 executes or conducts a search for the search query received through the interface unit 16; obtains the search result in response to the search query; and provides the obtained search result to the user through the interface unit 16. One embodiment of the present invention describes that the copy prohibition system 10 includes the search unit 18. In a modified embodiment of the present invention, the copy prohibition system 10 may not include the search unit 18, that is, the copy prohibition system 10 receives the search result obtained in response to the search query from an external search server (not shown).

The preview page for the webpage is stored in the database 20. The preview page can be stored in the database 20 by caching the webpage. In this case, caching means that the corresponding webpage is stored in the additional database so as to provide the corresponding webpage to the user rapidly. If needed, the webpage may be firstly edited and then stored as well.

One embodiment of the present invention describes that the database 20 is included in the copy prohibition system 10. In the modified embodiment of the present invention, the copy prohibition system 10 may use the database (not shown) included in the external search server (not shown), instead of including the database 20 therein.

The copy prohibition unit 22 generates the copy prohibition means; and inserts the generated copy prohibition means into the preview page read from the database 20. In the embodiment of the present invention, generation and insertion of the copy prohibition means may be implemented using Java Script. Java Script corresponds to a script programming language proposed so as to dynamically execute the webpage, that is, object-based script programming language based on a prototype concept.

The copy prohibition unit 22 generates the copy prohibition means using Java Script; and inserts the generated copy prohibition means into HTML document of the corresponding preview page using tag "script".

When the copy prohibition unit 22 generates the copy prohibition means in one embodiment of the present invention, it is possible for the copy prohibition means to include information displaying that the copy is prohibited in the corresponding preview page. Thus, the user becomes easily aware of that the copy is prohibited in the corresponding preview page.

In the above embodiment of the present invention, the copy prohibition unit 22 directly generates the copy prohibition means; and inserts the generated copy prohibition means into the preview page. In the modified embodiment of the present invention, the copy prohibition unit 22 may insert the copy prohibition means generated by the external server into the preview page. In this case, the copy prohibition unit 22 receives the copy prohibition means from the external server; and inserts the received copy prohibition means into the preview page.

In the above embodiment of the present invention, the copy prohibition system 10 inserts the copy prohibition means into the preview page. In another embodiment of the present invention, the copy prohibition means may be selectively inserted into the preview page.

For this, the copy prohibition system 10 includes a determining unit 24 to determine whether the copy prohibition function is included in the webpage on user's preview request. Thus, only when it is determined that the copy prohibition function is included in the corresponding webpage, the copy prohibition means is inserted into the preview page.

In case of the webpage built so as to prohibit the copy of predetermined information, the webpage can prohibit the copy of information in itself. General preview services do not allow the execution of script. In this respect, the copy prohibition of preview page is determined based on whether the webpage includes the copy prohibition function in itself.

In one embodiment of the present invention, the determining unit 24 determines whether the webpage includes the information for the copy prohibition of webpage in a webpage parsing step for generating the preview page, to thereby determine whether the webpage includes the copy prohibition function. For example, it is determined that the corresponding webpage includes the copy prohibition function when the corresponding webpage includes a code for realizing the copy prohibition function, or a tag for a copy or paste pre-defined in Java Script object of the webpage.

In another embodiment of the present invention, when a Uniform Resource Location (URL) of the webpage falls into any URL in a list of predetermined URLs, the copy prohibition function can be inserted into the preview page of the corresponding webpage. In this case, the determining unit 28 determines whether the URL of the corresponding webpage is included in the list of predetermined URLs.

In another embodiment of the present invention, the webpage may include the copy prohibition function in itself. Then, it could be determined whether the copy prohibition function of the webpage is also implemented in the preview page in the webpage caching step. If not, the copy prohibition means may be inserted into the preview page.

The above-mentioned embodiment of the present invention describes that the copy prohibition system 10 is applied to the webpage included in the search result. In a modified embodiment of the present invention, the copy prohibition system 10 may be applied to a general webpage other than the webpage included in the search result. For example, a website may provide link information for certain contents, and also provide a preview service for the corresponding contents.

A method for prohibiting the copy of preview page using the aforementioned copy prohibition system according to the present invention will be described with reference to FIGS. 3 and 4. Referring to FIG. 3, first, the search query is received from the user, and the search result obtained in response to the corresponding search query is provided to the user (S100).

When the selection request for the preview page of the predetermined webpage included in the search result is received from the user (S110), the corresponding preview page is read from the database 20 (S120), and the copy prohibition means to be inserted into the preview page is generated (S125). Then, after inserting the generated copy prohibition means into the preview page read (S130), the preview page with the copy prohibition means inserted thereinto is provided to the user (S140). In one embodiment of the present invention, the generation and insertion of the copy prohibition means can be implemented using Java Script.

The aforementioned embodiment of the present invention describes that the copy prohibition means is inserted into the preview page. In the modified embodiment of the present invention, the copy prohibition means may be inserted selectively.

As shown in FIG. 4, the search query is received from the user, and the search result obtained in response to the corresponding search query is provided to the user (S200). When the selection request for the preview page of the predetermined webpage included in the search result is received from the user (S210), the corresponding preview page is read from the database 20 (S215).

Then, it is determined whether the webpage of the corresponding preview page includes the copy prohibition function in itself (S220). When it is determined that the corresponding webpage includes the copy prohibition function in itself, the copy prohibition means is generated (S225); the generated copy prohibition means is inserted into the preview page read (S230); and the preview page with the copy prohibition means inserted thereinto is provided to the user (S240).

In case of the webpage built so as to prohibit the copy of predetermined information, the insertion of the copy prohibition means into the preview page is determined based on whether the webpage includes the copy prohibition function in itself, so that it disenables the copy of the predetermined information included in the webpage. General preview services do not allow the execution of script. In this respect, the copy prohibition of preview page is determined based on whether the webpage includes the copy prohibition function in itself.

If the webpage includes the copy prohibition function in itself, it may be necessary for the preview page to include the copy prohibition function therein. If not, it may not be necessary for the preview page to include the copy prohibition function therein.

When the copy prohibition function is not included in the preview page, the copy prohibition means can be inserted into the preview page after determining whether the corresponding webpage includes the copy prohibition function in itself and the copy prohibition function of the corresponding webpage is also implemented in the preview page in the webpage caching step. When it is determined that the webpage of the corresponding preview page includes the copy prohibition function in itself during the step of S220, the preview page read from the database 20 is provided to the user (S250).

In another embodiment of the present invention, it is determined whether the URL of the corresponding webpage is included in the list of predetermined URLs. When the URL of the corresponding webpage fall into any URL in the list of predetermined URLs, the copy prohibition function may be inserted into the preview page of the corresponding webpage.

The aforementioned copy prohibition methods may be implemented in type of programs executed by various computers. In this case, the programs to execute the copy prohibition methods are stored in recording media readable by the computers, for example, hard-disc, CD-ROM, DVD, ROM, RAM or flash memory.

As mentioned above, when receiving the preview request, the preview page with the copy prohibition means inserted thereinto is provided to the user, thereby protecting the copyright of webpage by prohibiting the illegitimate copy of the information displayed on the preview page.

When providing the preview page to the user, the user can be notified that the corresponding preview page has the copy prohibition function. Thus, the user becomes easily aware of that the copy is prohibited in the corresponding preview page.

The insertion of the copy prohibition means into the preview page is determined based on whether the webpage with the preview page requested by the user includes the copy prohibition function in itself, so that it is possible to reflect the intent of building the webpage with the copy prohibition function.

For example, the aforementioned embodiment of the present invention describes that the copy prohibition means is inserted into the preview page. The preview page is only one example of caching the predetermined webpage. The insertion of copy prohibition means according to the present invention can be applied to all cases of caching the predetermined webpage, for example, more-view page or stored page, without limitation.

The aforementioned embodiment of the present invention describes that the copy prohibition means inserted into the preview page is implemented in type of Java Script. In the modified embodiment of the present invention, the copy prohibition means may be implemented in type of Active X control, and furthermore, in any types of program execution code to prohibit the copy of preview page.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a copy prevention feature in a preview of a web page using a processor, the method comprising:
    selecting at least a portion of a first webpage;
    formulating a content comprising a preview of the first webpage, the preview comprising the selected portion;
    determining, by the processor, whether the first webpage is included in a database of webpages that comprise copy-protection, and
    transmitting, to a remote terminal, the content along with a command inserted into the preview for preventing the preview from being copied on the remote terminal, in response to the determination that the first webpage is included in the database.

2. The method of claim 1, wherein the command is configured to trigger a computer program for blocking a copying function of a browser.

3. The method of claim 1, wherein the command is incorporated in codes for displaying the content.

4. The method of claim 3, wherein the codes comprises a Java Script.

5. The method of claim 1, wherein the content comprises a search result listing a plurality of webpages comprising the first webpage.

6. The method of claim 1, wherein the content comprises a synopsis of a book or literature comprising a portion of the book or literature as the preview.

7. The method of claim 1, further comprising receiving, from the remote terminal, a request for displaying a preview of the first webpage,
    wherein the selecting is carried out subsequent to the receiving of the request.

8. The method of claim 1 further comprising:
    determining whether a second webpage is included in the database.

9. The method of claim 8, further comprising:
    determining if the second webpage comprises copy-prevention technology for information contained therein, if the second webpage is not included in the database; and
    adding the second webpage to the database, if the second webpage is determined to include copy-prevention technology.

10. The method of claim 1, further comprising determining if the portion of the first webpage is copy-protected, prior to the transmitting.

11. The method of claim 10, wherein determining comprises searching for a copy-preventing command in codes of the first webpage.

12. A non-transitory computer-readable recording medium having embodied thereon an executable program which, when executed, performs the method of claim 1.

13. A system for providing a web content comprising a preview of a webpage, the system comprising:
    a storage device;
    an interface unit configured to select at least a portion of a first webpage from the search results, to formulate web content comprising a preview of the first webpage, the preview comprising the selected portion, and to transmit the web content to a remote terminal, along with a command inserted into the preview for preventing the preview from being copied on the remote terminal; and
    a determining unit stored on the storage device and configured to determine whether the first webpage is included in a database of webpages that comprise copy-protection,
    wherein the interface unit transmits the web content along with the command to the remote terminal, when the first webpage is included in the database.

14. The system of claim 13, wherein the determining unit further determines if the portion of the first webpage is copy-protected.

15. The system of claim 13, wherein the command is configured to trigger a computer program for blocking a copying function of a browser on the remote terminal.

16. The system of claim 13, wherein the command is incorporated in codes for displaying the web content.

17. The system of claim 13, wherein the codes comprises a Java Script.

18. The system of claim 13, wherein the web content comprises a search result comprising the webpage.

* * * * *